Dec. 29, 1959   M. G. GRANT ET AL   2,919,030
FILTER-DEHYDRATOR
Filed Jan. 20, 1956   2 Sheets-Sheet 2
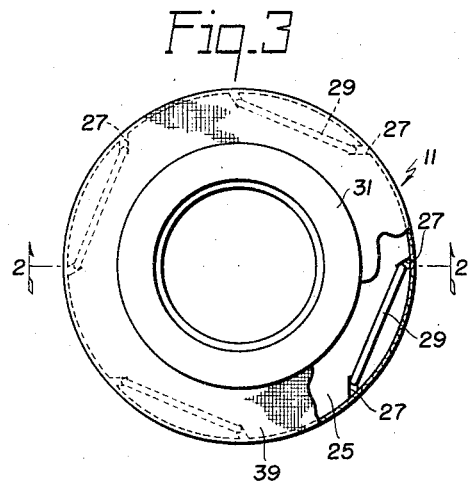
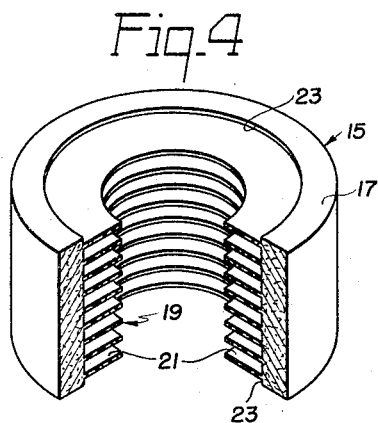
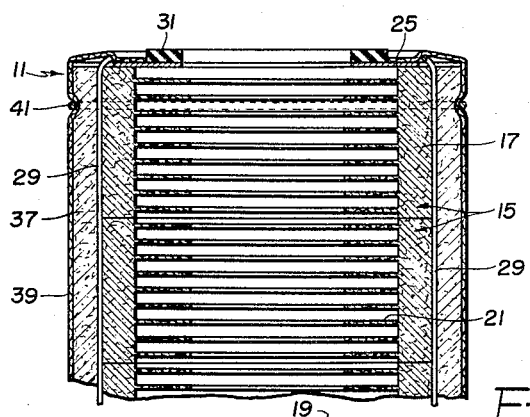
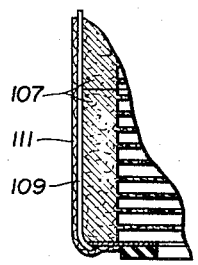
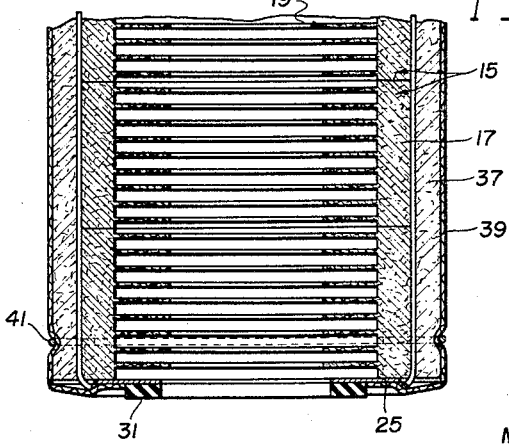
INVENTORS.
MICHAEL G. GRANT
GEORGE J. TOPOL
BY
*Albert L. Jeffers*
ATTORNEY United States Patent Office 2,919,030
Patented Dec. 29, 1959

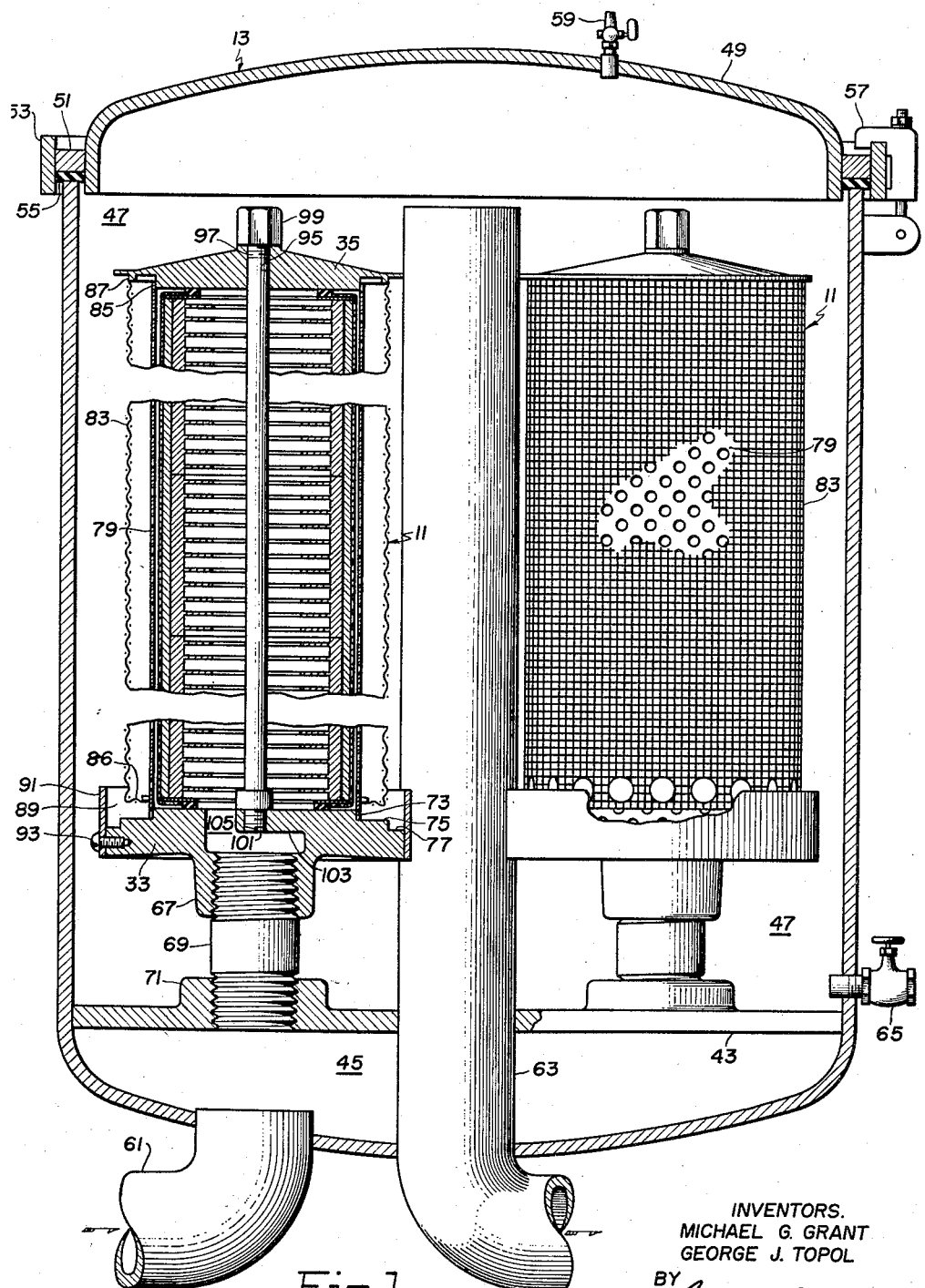

2,919,030

FILTER-DEHYDRATOR

Michael G. Grant, Baltimore, Md., and George J. Topol, Hamilton, Ontario, Canada, assignors to Bowser, Inc., Fort Wayne, Ind., a corporation of Indiana Application January 20, 1956, Serial No. 560,440

5 Claims. (Cl. 210—488)

The invention relates generally to means for purifying or conditioning a liquid and more particularly is directed to an assembly which serves to remove substantially all foreign matter and/or water from liquids, such as light fuels, solvents, distillates and light petroleum liquids.

The assembly embodying the invention may be employed wherever desired but has been primarily designed and constructed for use in conditioning fuels used in aircraft engines where efficient operation is essential. The subject invention has proven exceptionally advantageous in filtering and dehydrating such fuels so as to assure freedom from engine failure or erratic operation, incomplete combustion, corrosion and undue accumulation of carbon deposits frequently due to sludge and water.

With the foregoing in mind, one of the principal objects of the invention is to provide an assembly of improved design and construction which preferably includes a primary filter of tubular cylindrical shape comprised of a plurality of stacked fibrous elements, a secondary filter of sheet material wrapped to provide a cylindrical formation or jacket around the primary filter, and a cover or stocking surrounding the secondary filter, with means securing the elements together and plural means for securing the cover in place to provide a compact stable replaceable unit or cartridge.

The primary filter performs the desirable functions of coalescing minute particles of entrained water into larger particles or droplets and removing these along with any foreign solid matter of micronic size from the liquid. The elements constituting the primary filter may be designed and constructed in various ways but as disclosed herein, each element is constructed from a fibrous material, such as fiber glass, which is formed into the shape of a tubular cylinder and provided with a plurality of internal axially spaced corresponding radially extending annular ribs or fins having free inner marginal edge portions over and about and through which the liquid circulates. Otherwise expressed, each element is provided with a longitudinally extending centrally disposed opening forming a passage and with internal axially spaced annular grooves forming pockets communicating with the opening and forming annular ribs or fins integral with a thickened cylindrical or peripheral portion of the element. The grooves may be constructed as desired but are preferably formed by a special tool which is inserted into the opening of each element to cut or otherwise remove the material. The ribs and/or grooves serve to provide relatively large internal filtering surface areas or portions within a minimum of space. The fibers comprising each element, including those of the secondary filter, are held together in a relatively stable compressed condition or state by a suitable binding agent, such as a phenal formaldehyde thermosetting resin.

A specific object of the invention is to provide a filter in which the ends of each tubular element are provided with recesses of a size whereby when the opposed ends of the elements are brought together the recesses will form cavities corresponding in size and shape to the grooves in order to promote uniformity in the structure and filtering action.

The densities of the primary and secondary filters may be varied, but as herein disclosed, an important object of the invention is to make the primary filter of a greater density than the secondary filter, so that a liquid will flow through the primary filter at a slightly faster rate than through the secondary filter, the purpose of which is to reduce the resistance to flow and thereby promote the filtering action and at the same time prolong its life, and reduce to a minimum the factor of a break down or a bursting of the filter structure. In other words, the primary filter is more permeable with respect to a petroleum liquid than the secondary filter, and both are more permeable to such a liquid than water. The primary filter also offers the advantage that it can be subjected to a higher operating pressure as compared to a filter composed of a plurality of stacked filtering elements of different densities.

A significant object of the invention is to provide a secondary filter which is of a somewhat lesser density than the primary filter, as alluded to above, so as to obtain a finer and better selectivity of filtering action as compared to the primary filter. The secondary filter is wrapped or disposed about the primary filter and the two complement one another to provide a positive and efficient filtering of liquid in a way not obtained prior to the advent of the subject invention. This secondary filter also functions to coalesce any water and remove it along with any foreign matter which may have escaped entire removal by the primary filter.

An important object of the invention is to provide a secondary filter which also serves to prevent what may be termed "media migration." Otherwise expressed, the secondary filter prevents the passage of any fibers loosened from the primary filter from passing through the secondary filter into the liquid and thereby insures the production of an ultra-clean liquid.

Another object of the invention is to provide a filter assembly of the kind above referred to, in which a cover, preferably in the form of a woven fabric, is placed about the secondary filter to provide a third filter to further promote coalescence of water and removing it along with any foreign matter passing through the secondary filter. The cover also assists in holding the secondary filter or jacket in place.

An additional object of the invention is to provide novel means for securing the tubular elements of the primary filter in a compressed condition and means for holding the cover in position about the secondary filter.

Another object of the invention is to provide a replaceable cartridge or filter assembly constructed to facilitate installation thereof in either of two operative positions.

Another object of the invention is to provide a filter and liquid separator apparatus which, among other things, includes a filter assembly, a supporting structure for the assembly, a tubular foraminated cylinder concentrically arranged about the assembly, and a tubular screen cylinder concentrically disposed about the foraminated cylinder, the purpose and construction of which will be described in detail subsequently.

A further object of the invention is to provide a unique method of assembling the filter assembly which preferably consists in stacking a plurality of tubular fibrous elements to form a tubular unit, compressing the elements and securing them together in compressed relation, placing a jacket constructed of fiber glass or equivalent material about the unit, securing the jacket at the ends of the unit, placing a woven fabric cover or the equivalent about the jacket, securing the cover at the ends of the unit in overlapping relation on the ends of the jacket, and additionally securing the cover in position by a plurality of bands surrounding the cover at longitudinally spaced locations.

Other objects and advantages of the invention will become apparent after the description hereinafter set forth is considered in conjunction with the drawings annexed hereto which exemplify a preferred embodiment of the invention.

In the drawings:

Figure 1 is a vertical section taken through apparatus exemplifying the preferred way of installing the filter assembly;

Figure 2 is a sectional view taken along lines 2—2 of Figure 3;

Figure 3 is a top view of the cartridge or filter assembly shown in Figure 2;

Figure 4 is a perspective view of one of the tubular elements comprising the primary filter, with a section removed to illustrate the internal structure of the element; and Figure 5 is a partial view of a modified filter assembly in which the secondary filter is omitted.

The filter assembly or cartridge embodying the subject invention, generally designated 11 and depicted in Figure 2 of the drawing, is preferably supported for use in a tank apparatus exemplified and generally designated 13 in Figure 1. This apparatus will be described in detail following the description of the cartridge.

The principles of design and construction embodied in the primary filter and constituting a component of the filter assembly or cartridge will now be fully described. As illustrated in Figures 2 and 4, this filter is preferably comprised of a plurality of tubular elements or plugs generally designated 15 which are stacked and secured together in an end to end relationship to constitute a unit. The elements are substantially identical, and each includes a body having a relatively thick cylindrical or peripheral portion 17 and a plurality of corresponding radially extending internal annular formations, which may be referred to as vanes, interruptions, webs, or ribs 19 which are equally spaced axially of the element.

The ribs or vanes may be constructed in various ways but as disclosed herein, each element is provided with a round axially extending centrally disposed opening and a suitable cutting tool is inserted into the opening to cut or otherwise remove material to form internal axially spaced annular grooves 21 whereby the ribs are produced. The diametrical dimensions of the grooves are less than the diameter of the element and as a result, the element is formed with the thick peripheral portion above referred to. It will be noted that each vane is provided with an aperture and that the axial dimensions of the grooves are preferably greater than the axial thicknesses of the vanes. The vanes are yieldable to some extent and the grooves form pockets or cavities. With this unique structure a multitude of internal filtering portions and/or large surface areas are provided which can rather quickly accommodate or filter a large volume of liquid circulating under pressure in the grooves and about and through the vanes and peripheral portions of the unit. In other words, there is provided a maximum of filtering portions or surface areas within a minimum of space. As stated above, the primary filter is preferably constructed from a fibrous material, such as fiber glass, and is made somewhat denser or more compact than the secondary filter.

Attention is directed to the fact that the end of each tubular element is provided with an annular recess 23 of a diameter corresponding to each grove but of an axial dimension or depth substantially equal to one-half of the depth of each groove so that when the ends of the elements are brought together, as shown in Figures 1 and 2, the opposed recesses will jointly form a cavity corresponding in size and shape to a groove, the purpose of which is to promote uniformity in the construction and filtering action.

The primary filter may be comprised of any number of tubular elements desired but as shown in Figures 1 and 2 of the drawing, thirteen elements are preferably provided. The elements are stacked and compressed and are preferably held in this condition by suitable fastening means to provide an elongated tubular filter structure. The fastening means preferably employed includes a pair of corresponding flat round washers or end attaching members 25 respectively abutting the ends of the stacked unit. These washers are preferably of a diameter slightly greater than the diameter of the unit and the peripheral edges of the washers are provided with receiving means, preferably in the form of circumferentially spaced pairs of converging slots 27, as shown in Figure 3, through which a flexible member, such as a wire 29, is disposed or interlaced and secured with portions of the wire longitudinally engaging and holding the elements in a relative firm condition to prevent axial expansion of the elements. The slots, due to their converging relation, serve to direct the wire toward the center of the unit and prevent its escape when tightened. The washers are preferably cemented to the ends of the stacked elements in addition to being held by the wire. A pair of corresponding flat gaskets 31 of a diameter somewhat less than the diameter of the washers are preferably cemented to the washers for sealing the ends of the cartridge when firmly clamped in place in the supporting apparatus between heads 33 and 35 of a supporting structure in the tank apparatus 13.

The secondary filter designated 37 may also be designed and constructed in various ways but as depicted, it is comprised of a sheet of fibrous material, such as fiber glass, which is wrapped rather tightly about the primary filter to provide a cylindrical formation or jacket surrounding the primary filter. The sheet is preferably of a size to completely surround and provides a uniform layer of material over the primary filter. The longitudinal marginal edges of the sheet are pressed into intimate engagement and the marginal end portions of the sheet are preferably cemented to the peripheral edges of the washers and such cement also serves to lock the wire in the slots 27.

The secondary filter as alluded to above, is preferably made somewhat less denser than the primary filter and also serves the same general purpose as the primary filter with respect to removing water and solids. This secondary filter assures a finer filtration of the liquid and will remove some water and solids which escape radially through the primary filter. The secondary filter further serves the important role of catching and removing any fibers released from the primary filter, thus preventing what is termed above as "media migration."

In order to further promote the filtering of a liquid, a third filter designated 39, preferably in the form of a woven fabric such as a tubular cotton stocking, is placed in a snug or stretched condition about the secondary or intermediate filter and its ends are drawn over and preferably secured by cement in overlapping relation against the washers 25 as illustrated in Figures 2 and 3. This filter is previous to oil and water. This filter is also preferably additionally secured in place by a pair of longitudinally spaced flexible bands 41 which overlie and cross the longitudinally extending portions or lengths of the wire 29. The flexible bands are preferably in the form of wires which are secured by twisting the ends thereof. This crossing of fastening means longitudinally and transversely of the unit also serves to stabilize and strengthen the cartridge.

The apparatus generally designated 13 in Figure 1 of the drawing in which a plurality of cartridges are preferably used will now be described. The apparatus includes a tank provided with a deck plate 43 which extends across the lower end of the tank to form an inlet chamber or compartment 45 and an upper effluent chamber or compartment 47 within which the cartridges are supported. The tank is provided with a removable cover 49 which includes a radial flange 51 and an axial flange 53. A gasket 55 is disposed between the radial flange and the tank to provide a seal. The tank is provided with a plurality of clamping means like 57 to engage over the axial flange 53 for securing the cover to the tank. A valved vent 59 is provided in cover 49.

The tank is provided with an inlet conduit 61 connected at one end to the inlet chamber 45, and at the other end with a pump or other source of fuel under pressure (not shown). An outlet conduit 63 extends vertically through the bottom of the tank, the deck plate and terminates adjacent the upper end of the chamber 47. A valved drain tube 65 is disposed in the tank above the deck plate and communicates with the lower portion of the chamber 47.

The structure supporting the filter assembly or cartridge 11 includes the bottom mounting head 33 which is provided with a threaded boss 67 for receiving one end of a threaded nipple 69. The deck plate is provided with a threaded boss 71 for receiving the other end of the nipple 69. The bottom head 33 is provided with a series of concentric circular bosses 73, 75 and 77 on its upper face.

As exemplified in Figure 1, the lower end of a foraminated cage or canister 79, preferably of metal, is arranged over the boss 73 on the lower head 33 and its other end about a similar boss 85 formed on the upper head 35 of the supporting structure to maintain the cage in concentric relation to the cartridge. This cage serves to impart stability to the structure and as an accumulator because some water coalescing on the exterior surface of the third filter will collect on the cage, particularly on the exterior surface of the cage after passing through the holes or apertures therein; and as some of the droplets accumulate or collect they will pass through and/or run down the cage and some of the droplets will impinge against the cylindrical screen 83 and fall downwardly toward the trap 89.

The lower end of the screen is provided with an annular flange 86 which surrounds the cage and the upper end of the screen cylinder surrounds an annular depending flange 87 provided on the upper head or cap 35 to maintain the screen in concentric relation to the cage and substantially directly above a water trap 89. This trap is preferably partly formed by an annular weir 91 secured by screws 93 to the periphery of the lower head 33 of the supporting structure. The lower extremity of the screen cylinder is preferably provided with a plurality of round openings, equally spaced circumferentially, to facilitate dispensing of any water on the screen into the trap. Any water separated from the liquid fuel collecting and flowing over the weir will collect to a depth on the deck plate where it can be drawn off through the valved outlet 65. The danger of water entering the effluent stream of fuel is thereby substantially eliminated.

The upper head 35 is provided with a hole 95 which receives a rod 97 which is threaded at both ends. A nut 99 is mounted on the upper end of the rod to seal the hole 95, while the lower end of the rod is screwed into a tapped hole 101 provided in a web 103 of the lower mounting head 33. A port or opening 105 is formed in the lower head so that liquid rising in the nipple 69 will enter the interior of the cartridge or filter assembly.

The fuel including contaminants, water and water emulsion is delivered under pressure through the conduit 61 into the chamber 45 whence it flows to the interior of the cartridge via the nipple 69 and port 105. The fuel circulates into the pockets formed by the grooves and about the vanes 19 which have a tendency to slow the turbulence of the fuel thereby creating a favorable condition for coagulation of contaminant and present large filtering surfaces or areas for a thick cake to form thereupon before the pressure differential reaches a critical value. At the beginning of the operation most of the fuel will flow through those portions of the peripheral portions 17 opposite the grooves but they soon become covered with a layer of contaminant and the liquid seeks a way of lower resistance through the whole body of the filtering elements.

The primary and secondary filters of the cartridge as alluded to above perform the functions of progressively coalescing minute particles of entrained water into markedly larger particles and of removing solids, including particles of micronic size from the liquid. The cotton sleeve constituting the third filter provides a third coalescing element so that the water droplets are increased in diameter as they form on the exterior surface of the sleeve.

After passing through the cartridge, the liquid flows through the cage 79 to the interior of the screen cylinder 83 where the water particles in some instances coalesce into large drops of water and then fall by gravity, downwardly between the cage and screen to the water trap 89. The water from the trap finds its way into the bottom of the chamber 47 where it may be removed through the drain 65.

The treated fuel passes out through the screen 83 into the upper portion of the chamber 47 and out the conduit 63 for the use intended.

When the cartridge becomes clogged or ineffective the clamping means 57 are released and the cover 49 is removed, then the nut 99 and rod 97 are removed to release the cartridge which may then be lifted out of the unit and a new one installed in its place. The unit is reassembled in an obvious manner.

The modified filter assembly illustrated in Figure 5 of the drawing substantially corresponds to the assembly above described, except that a secondary filter such as 37 above referred to is omitted. This modified assembly or cartridge is adopted for use in some installations when a secondary filter is not required. More particularly, this modified form of cartridge comprises a plurality of tubular elements 107 like those above described, including washer or attaching end members, longitudinally extending fastening means 109 connecting the end members, and a tubular woven fabric or sleeve 111 secured about the tubular members by cementing the ends of the sleeve to the end members.

Although we have described our invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

We claim:

1. An assembly of the kind described, comprising an elongated tubular structure constructed of fiber glass material of a predetermined density, said structure being provided with a plurality of radially extending and axially spaced filtering portions, members including spaced pairs of converging slots disposed at the ends of the structure, a plurality of circumferentially spaced longitudinally extending means engaging in said slots connecting the members for imparting stability to the structure, a layer of fiber glass material of a less density than that of the structure surrounding the latter, and means securing the said layer in place.

2. The assembly defined in claim 1, in which the securing means includes: a sleeve pervious to a liquid disposed about the structure and longitudinally extending means, means attaching the ends of the sleeve to said members, and a band about the sleeve.

3. A filter assembly comprising plurality of axially disposed plate-like spaced tubular elements providing a primary filter unit provided with a plurality of radially extending and axially spaced filter portions defining a longitudinal passage through which a liquid may circulate, members respectively engaging the ends of the unit, said members provided with spaced pairs of converging slots, means extending lengthwise of the unit and disposed in the slots on the members for securing the tubular elements in alignment, a layer of material surrounding the elements and extending means and constituting a secondary filter, a sleeve surrounding the layer of material and constituting a third filter, and means securing the sleeve in place.

4. Apparatus of the character described for separating water from fuel comprising a tank having a lower chamber provided with an inlet and an upper chamber provided with an outlet pipe extending through the lower chamber, supporting means disposed in the upper chamber, said supporting means including a lower head and an upper head, a tubular filter disposed between the heads for coalescing the water in the fuel into droplets, a rod extending through the filter and detachably connecting the heads, a foraminated tube disposed about the filter, a sleeve of screen material surrounding the tube, and one of the end members constitutes a component of a trap disposed below the sleeve for accumulating the water droplets so that they will flow downwardly in a stream toward the water outlet, said trap including an annular weir secured to said one of said end members, said sleeve of screen material including a plurality of circumferentially spaced openings facilitating dispensing of water on said sleeve into said trap.

5. A cartridge for a water-fuel separator comprising in combination, a plurality of axially disposed tubular elements constructed of fiber glass material of a predetermined density forming a primary filter-coalescer unit, said tubular elements provided with a plurality of annular grooves forming annular vanes therebetween of an axial thickness somewhat less than the axial dimensions of the grooves, said tubular elements having abutting ends provided with radially disposed recesses cooperating to define a chamber having an axial dimension substantially corresponding to the axial dimension of the grooves, a pair of spaced members having spaced pairs of converging slots, disposed at the ends of the primary filter-coalescer, a number of circumferentially spaced longitudinally extending means engaging in said slots connecting the members for imparting stability to the primary filter-coalescer, a sleeve of fiber glass material constituting a secondary filter-coalescer surrounding the primary filter-coalescer, said secondary filter-coalescer having a less density than the primary filter-coalescer, a pervious sleeve surrounding the secondary filter-coalescer, and means for securing the sleeve in place.

References Cited in the file of this patent

UNITED STATES PATENTS

| | | |
|---|---|---|
| 125,786 | Brown | Apr. 16, 1872 |
| 559,439 | Conrader | May 5, 1896 |
| 2,064,097 | White | Dec. 15, 1936 |
| 2,392,901 | Brown | Jan. 15, 1946 |
| 2,408,130 | Vokes | Sept. 24, 1946 |
| 2,446,979 | McLellan | Aug. 10, 1948 |
| 2,471,069 | LeClair | May 24, 1949 |
| 2,539,768 | Anderson | Jan. 30, 1951 |
| 2,550,853 | Nugent | May 1, 1951 |
| 2,554,748 | Lewis et al. | May 29, 1951 |
| 2,651,417 | Malanowski | Sept. 8, 1953 |
| 2,654,483 | Ahlijian | Oct. 6, 1953 |
| 2,657,808 | Mankin | Nov. 3, 1953 |
| 2,670,851 | Curtis | Mar. 2, 1954 |
| 2,692,696 | Fleck | Oct. 26, 1954 |

FOREIGN PATENTS

| | | |
|---|---|---|
| 587,615 | Germany | Nov. 6, 1933 |
| 835,858 | France | Jan. 5, 1939 |
| 259,751 | Great Britain | Oct. 21, 1954 |

UNITED STATES PATENT OFFICE

CERTIFICATE OF CORRECTION tent No. 2,919,030            December 29, 1959

Michael G. Grant et al.

It is hereby certified that error appears in the printed specification of the above numbered patent requiring correction and that the said Letters Patent should read as corrected below.

Column 3, line 68, for "grove" read -- groove --;
column 4, line 60, for "previous" read -- pervious --.

Signed and sealed this 14th day of June 1960.

SEAL)
ttest:

ARL H. AXLINE
;testing Officer

ROBERT C. WATSON
Commissioner of Patents